United States Patent [19]

Santis

[11] Patent Number: 4,464,933

[45] Date of Patent: Aug. 14, 1984

[54] STEERING CONSOLE PROVIDING DIGITAL READOUT DISPLAYS

[75] Inventor: Dean C. Santis, Winfield, Ill.

[73] Assignee: International Harvester Co., Chicago, Ill.

[21] Appl. No.: 441,883

[22] Filed: Nov. 15, 1982

[51] Int. Cl.³ .............................. G01D 3/10; G01D 7/04
[52] U.S. Cl. ............................ 73/432 AD; 74/484 R; 116/62.4; 340/22; 340/700; 340/712
[58] Field of Search ............... 296/70, 71, 72, 73, 296/74; 180/79.4, 90; 73/432 AD; 248/27.1; 116/62.1, 62.4, 286, 305; D12/192; 364/424; 74/493, 484 R; 340/700, 712, 752, 52 F

[56] References Cited

U.S. PATENT DOCUMENTS

| | | | |
|---|---|---|---|
| 2,804,931 | 9/1957 | Najjar et al. | 116/62.1 X |
| 3,701,945 | 10/1972 | Gallant et al. | 364/424 X |
| 3,799,569 | 3/1974 | Baker et al. | 74/493 X |
| 3,962,931 | 6/1976 | Moneta et al. | 74/493 |
| 4,296,409 | 10/1981 | Whitaker et al. | 364/424 X |
| 4,368,454 | 1/1983 | Pilatzki | 74/484 R |
| 4,409,584 | 10/1983 | Arima et al. | 74/484 R |
| 4,429,588 | 2/1984 | Emundts | 74/484 R |

OTHER PUBLICATIONS

*Automotive Industries*, vol. 162, No. 8, Aug. 1982, p. 24, "Central Control Panel Does It All."

Primary Examiner—S. Clement Swisher
Attorney, Agent, or Firm—Boris Parad; F. David AuBuchon

[57] ABSTRACT

A steering console for tractors providing digital readout displays activated by a keyboard strategically located within easy finger reach of the operator. A multitude of vital tractor functions are automatically continuously monitored and, simply by touch of appropriate colored switch pads on the keyboard, the operator at will changes the digital displays to the different functions he desires to read. In one preferred embodiment thereof, my invention forms part of a unitary tilt-telescope steering wheel arrangement and displays dual digital readouts, such as of the ground speed and engine speed for being viewed for comparison side by side and simultaneously in the console.

21 Claims, 4 Drawing Figures

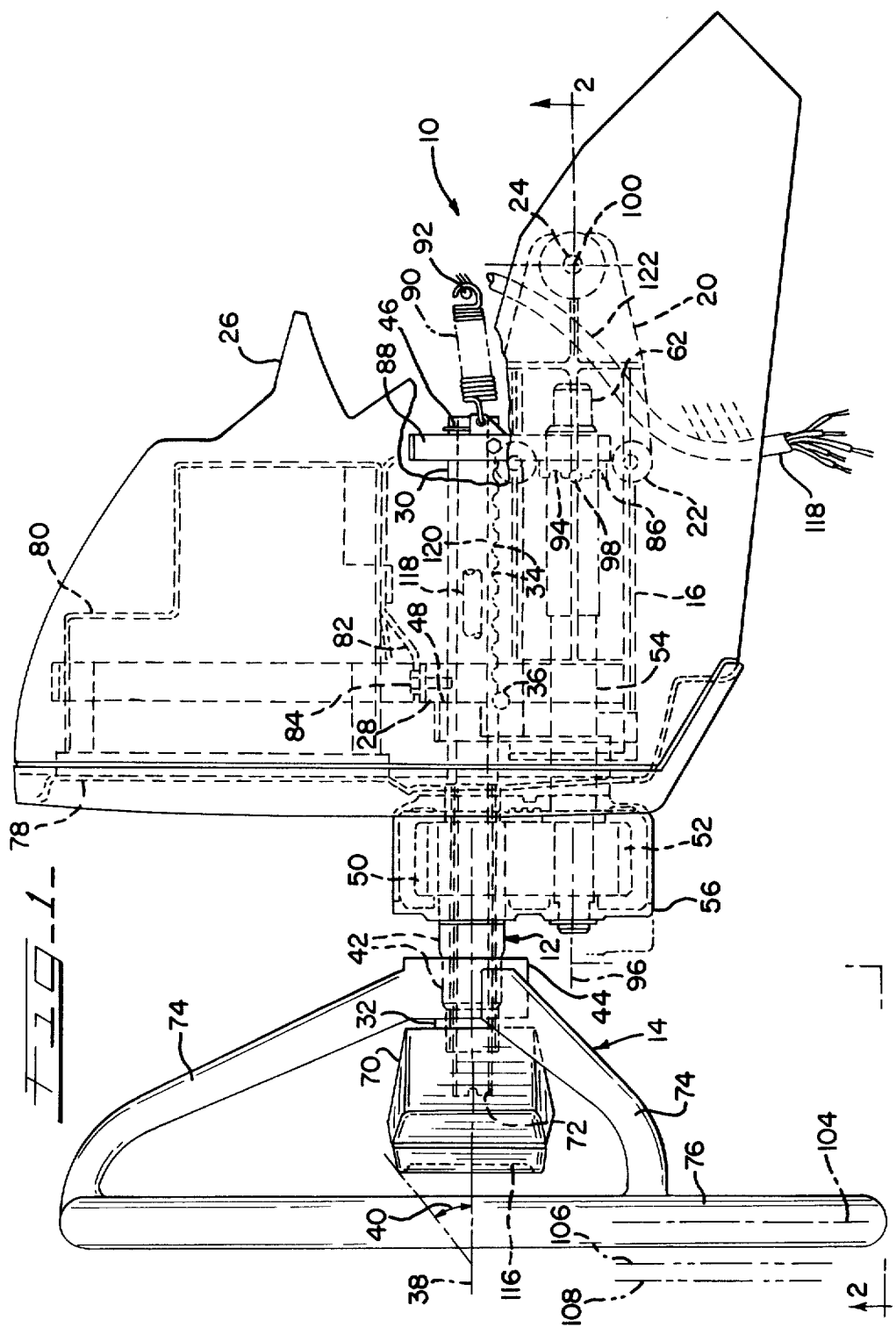

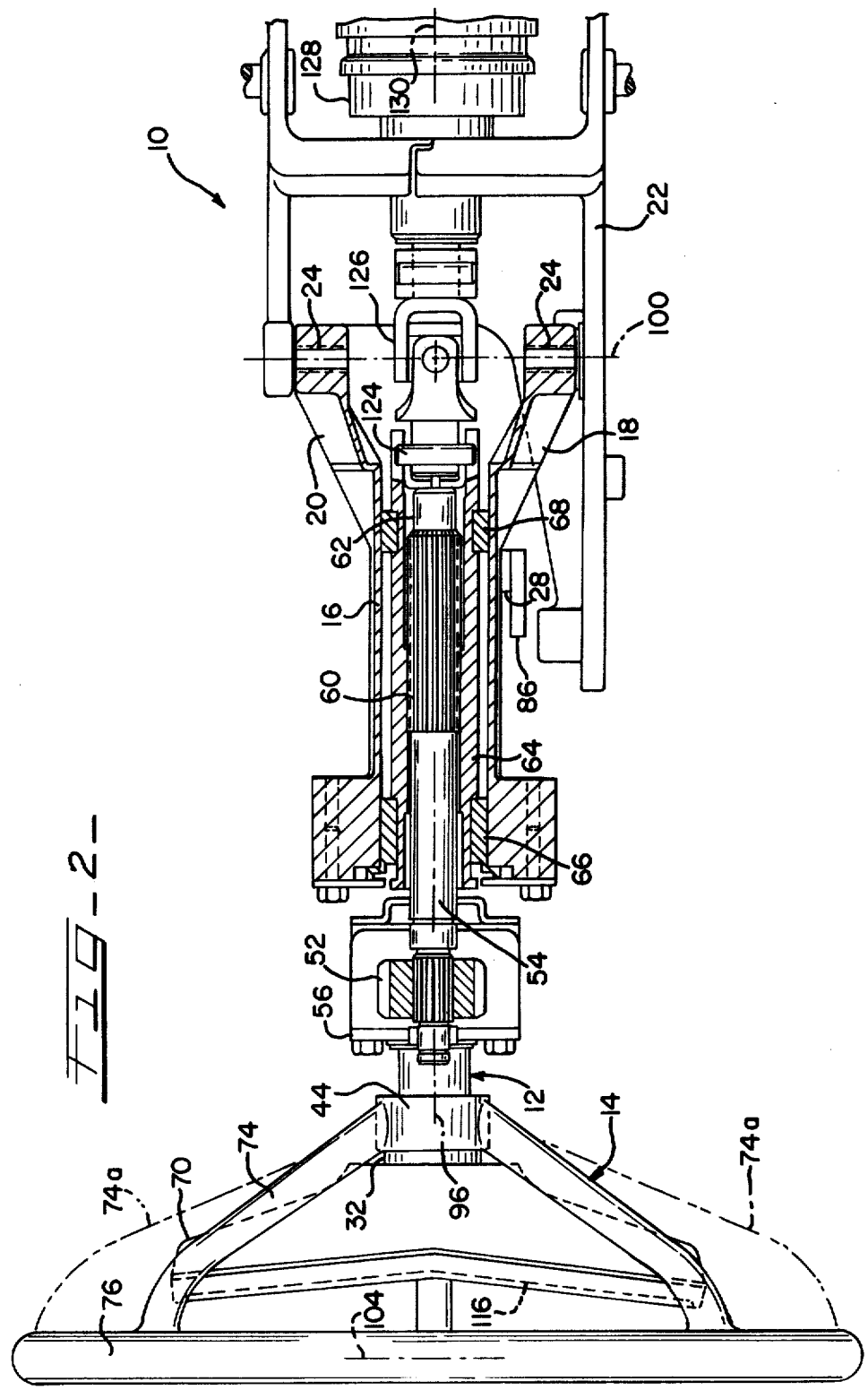

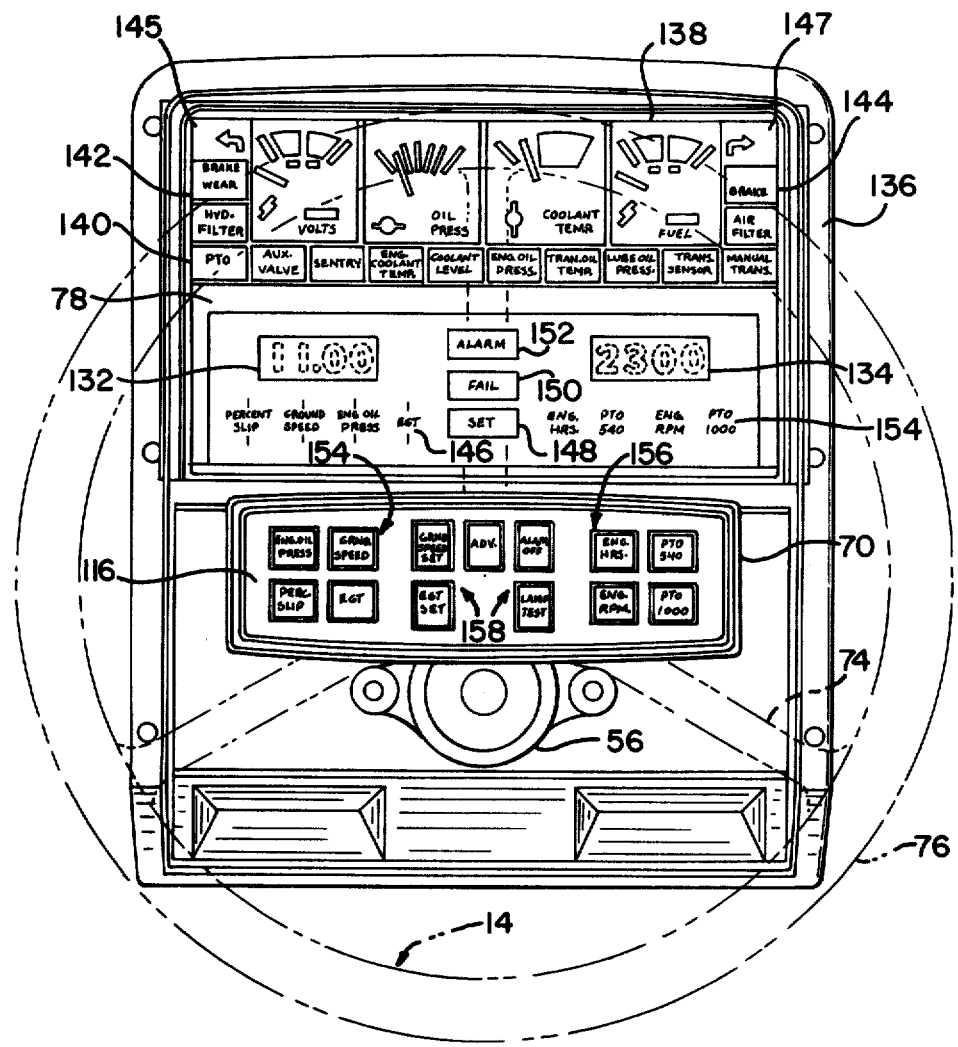

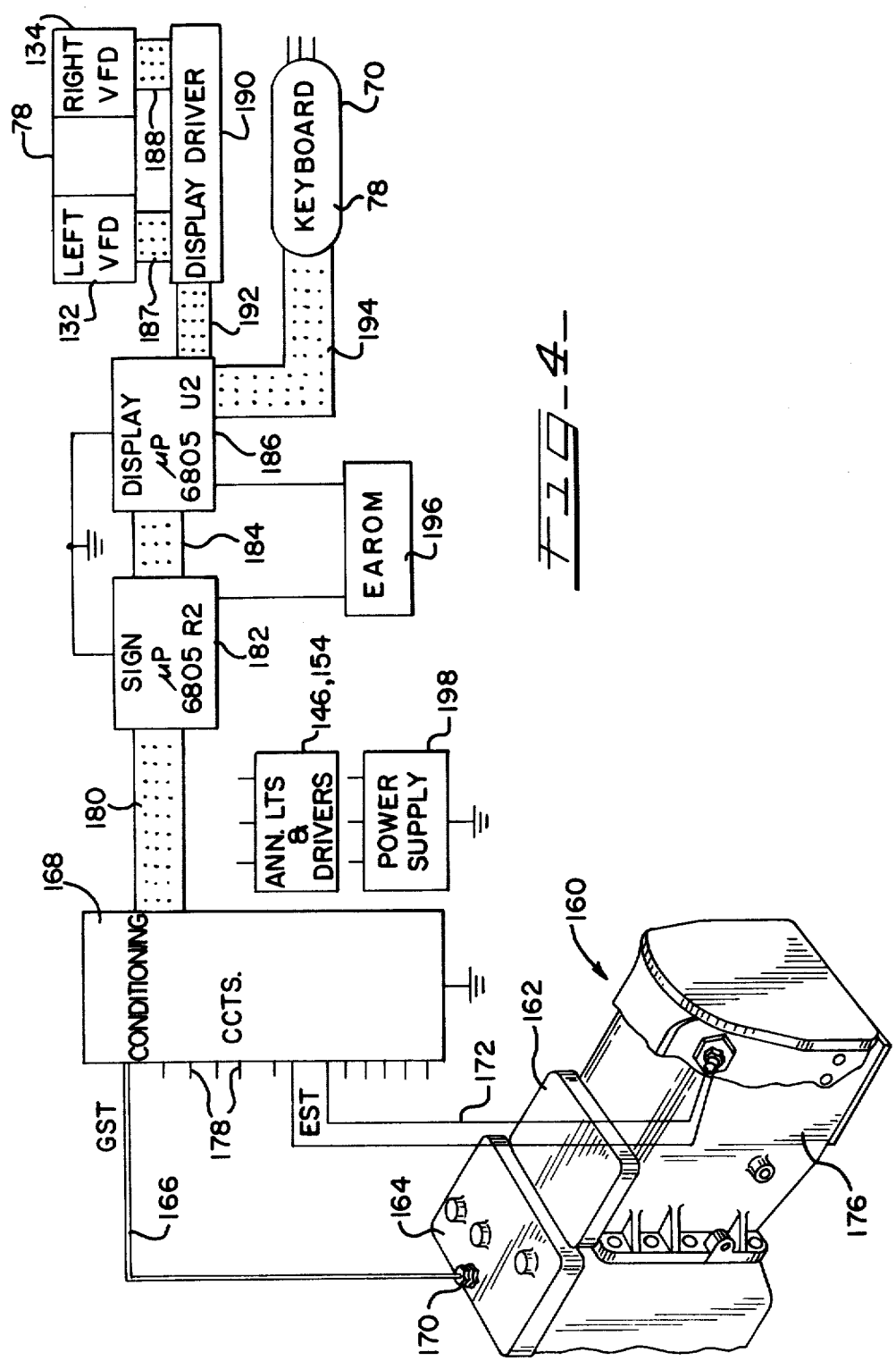

STEERING CONSOLE PROVIDING DIGITAL READOUT DISPLAYS

This application relates to a steering console for tractors, providing therefor digital readout displays activated by a keyboard strategically located within easy finger reach of the operator. A multitude of vital tractor functions are automatically continuously monitored and, simply by touch of appropriate colored switch pads on the keyboard, the operator at will changes the digital displays to the different functions he desires to read. In one preferred embodiment thereof, my invention displays dual digital readouts, such as of the ground speed and engine speed for being viewed for comparison side by side and simultaneously in the console.

The console according to the steering wheel arrangement hereof adapts itself to a tilt-telescope steering wheel rotatably mounted on a slanting steering column in the tractor. A pivotal supporting structure as provided is common to the wheel's steering column and to the console's regular instrument panel in which the digital readout displays are included.

The steering column in turn is common in terms of support provided to the steering wheel, of deep-dish shape, and to the keyboard, mounted captive on the steering column in confinement altogether within the deep-dish shape of the surrounding steering wheel.

The specific tilt and telescope actions of the steering wheel form no per se part of the present invention and are detailed in the co-assigned applications of Kenneth E. McKee et al., No. PCT/US82/00894 filed July 21, 1982 and corresponding U.S. Ser. No. 423,507 filed Sept. 27, 1982, the disclosure of which is incorporated in entirety herein by reference. Briefly, the common pivoted supporting structure mentioned is tilted with and by the steering wheel, thus maintaining with the wheel the self-same face angularity of the supported console instrument panel for continuous unobstructed comfortable observation by the operator. The common supporting steering column mentioned is telescoped with and by the deep-dish steering wheel, again maintaining the same angularity and also the proximity of the captive keyboard for continuous unobstructed comfortable observation to and handiness to the operator; in other words, telescoping the steering wheel in or out for convenience in making his finger grip thereon feel the most natural affords the same convenient and natural finger touch to the keyboard which as indicated always takes a tilt angle and a proximity identical to the steering wheel.

According to practice in the past, the man behind the wheel who tries to look down at his instrument displays, especially if to watch two side-by-side digital readouts or two instruments in a cluster for simultaneous comparison, finds the wheel spokes, hub, or rim partially or totally in the way. Therefore the practice is to shift his head around or, if the wheel has one-way or two way adjustability, to shift the steering wheel position for a clearer view, or both. The steering wheel, in conventional arrangements proves, in contrast to its admitted necessary and vital function, to also be an inconvenience, drawback, problem, handicap, or disadvantage to unobstructed reading of the standard fixed instrument panel. The same inconvenience holds true with respect to visibility of and access to toggle, twist, pull, and push button switches and controls mounted on the standard fixed instrument panel.

It is an object of my invention in the provision of a proximal keyboard, a distal instrument panel with digital readout displays, and a tilt steering wheel, to maintain all three at the same angularity to one another in all tilt positions so the operator at his viewing angle will always be looking past the wheel rim in full view of keyboard and panel.

A further object, in connection with the foregoing keyboard, panel, and with a tilt-telescope steering wheel, is to provide for all three to maintain substantially the same angularity in all tilt-telescope positions, again enabling the operator to look conveniently past the wheel rim likewise in full view of keyboard and panel.

Another object is to materially reduce, if not substantially eliminate, the foregoing inconvenience, drawback, problem, handicap, or disadvantage associated with the standard steering wheel which, when it occupies a momentary turned position not in the way of the instrument panel switches, controls, and instruments, will promptly seem to get in the way upon its next adjustment by turning, tilting, or telescoping.

An additional object, based on the unobstructed view provided foregoing, is as already indicated to afford side-by-side dual digital readouts on the console for viewing different but preferably correlated vehicle functions simultaneously.

Various features, objects and advantages will either be specifically pointed out or become apparent when, for a better understanding of my invention, reference is made to the following description taken in conjunction with the accompanying drawings which show a preferred embodiment thereof and in which:

FIGS. 1 and 2 are side elevational and bottom plan views respectively of a steering-console arrangement embodying my invention;

FIG. 3, in top plan, is a full face view of the console, with the steering wheel shown in phantom in the foreground and with a console activating keyboard shown nested within the steering wheel and likewise in the foreground; and FIG. 4 is an electronic block diagram including, with the keyboard and console, the vehicle function sources and balance of the support system.

More particularly, the steering-console arrangement 10 is shown in FIGS. 1 and 2 of the drawings including a steering column 12 having a four shaft arrangement and supporting a steering wheel 14. A steering column frame or casing 16 supports the column 12 and comprises pivot legs 18 and 20 mounted on a support base 22 forming part of a frame rigidly attached to the interior of a vehicle cab. More specifically, the pivot legs 18 and 20 are pivotally supported by a coaxial pair of horizontal pivot pins 24 extending inwardly from the support base 22. An external plastic housing or fairing 26 (FIG. 1) envelopes the distal or bottom portion of the arrangement 10 in keeping with the interior styling of the cab.

Locating bosses such as the boss 28 are symmetrically disposed on the steering column frame 16 and perform a number of functions understood in the art.

The four shaft arrangement of the steering column 12 has an upper pair of shafts which are one within another and which include an inner hollow spindle shaft 30. At the outer end of the spindle, a lock nut 32 limits the upward displacement of the steering wheel 14. The faced off bottom inner side of the spindle 30 has a plurality of longitudinally spaced apart transverse lock pin recesses 34 in the face. A lock pin 36 is slideably mounted for axial movement in the frame 16 for engagement into any one of the recesses 34 so that the spindle 30, slideably mounted in that same frame 16, can take axially fixed telescoped positions along the steering column axis as indicated at 38.

The axis 38 slants, one example being at the angle 40 of about 38° to the horizontal.

The face with the recesses 34 engages a slideway, not shown, in frame 16 to prevent the spindle 30 from rotating as it slides, and the longitudinal sliding of the spindle 30 outwardly is limited by engagement of a retaining ring 46 at the spindle end against a frame shoulder 48.

The other one of the upper pair of shafts consists of an outer stub quill shaft 42 which at the upper end is internally splined to the hub 44 of steering wheel 14, and which at the lower end integrally carries a drive pinion 50; the quill shaft 42 is journalled for rotation independently pendently on the spindle shaft 30 and, because of nut 32, the shaft 42 participates in conjoint sliding movement with the telescoping spindle shaft 30 of the pair (FIG. 1).

A driven gear 52 constantly meshing with the pinion 50 is splined to a steering shaft 54 adjacent the latter's outer end, which end is journalled in a gear housing 56. A long set of splines 60 is formed in the steering shaft inner end 62. The splines 60 internally engage a steering tube shaft 64 and, together, the shafts 54 and 64 respectively one within another constitute the lower pair of the four shaft arrangement hereof. The splines 60 enable the steering shaft 54 to telescopically slide to positions independently of the tube shaft 64 and yet to cause the latter tube shaft 64 to turn with the steering shaft in all such positions. Upper and lower plastic bushings 66 and 68, FIG. 2, journal the shaft 64 in the frame 16 but prevent the shaft from axially shifting therein.

A keyboard pod 70 centrally nested in the steering wheel 14 has a recess 72 receiving the outer end of the spindle shaft 30 which nonrotatably supports and is detachably fixed to the pod 70 (FIG. 1). In the deep dish construction of the steering wheel 14, the spokes 74 thereof are angled so as to rapidly diverge from the plane of the steering wheel rim 76 as they converge mutually toward the steering wheel hub 44. The conical path of rotation of such spokes as indicated at 74a in FIG. 2 and the path of revolution of the steering wheel rim 76 are such as to provide adequate clearance with the relatively nonrotatable instrument keyboard pod 70.

The generally bulbous keyboard pod 70 widens with increasing height, the side portions flaring at a double angle of about 140° so as approximately to parallel the frusto-cone angle of the spokes 74.

As shown in FIG. 1, an instrument console panel 78 includes a frame 80 having support brackets 82 attached by screws such as the screw 84 to one of the various locating bosses 28 previously mentioned. Because the steering column 12 tilts about the common horizontal axis of the coaxial pivot pins 24, the instrument console panel 78 rigidly secured to the column 12 is simultaneously tiltable therewith. So there is rigid fixation of the panel 78 providing a constant angular correlation between it and the rim 76 of the steering wheel so as to result in an unvarying view of the panel regardless of the steering wheel tilt position.

In connection with the tilt positioning just mentioned, an arcuate rack sector or plate 86 is appropriately secured by screws, not shown, to the frame boss 28 as shown in FIG. 2. Cooperating therewith for tilting purposes as shown in FIG. 1 are a boss supported bracket 88, and a counterbalance spring 90 secured at one end to an outrigger on the bracket 88 and anchored at the opposite hooked end on a fixed stud 92 carried by the support base 22. The sector or plate 86 along its arc has a series of arcuately spaced pin notches 94 by which a bellcrank, not shown, that rocks on the support base 22, FIG. 1, moves a locking pin 98 into and out of a selected pin notch 94 to lock the steering column and wheel 14 at a desired angle 40 of slope. The spring 90 and pins 24 therebelow suspend the cantilevered structure on axis 100 practically weightless to the feel of the operator.

In the present four shaft arrangement, the sliding quill 30 and spindle 30 shafts of the upper pair, and the sliding steering shaft 54 within the tube shaft 64 of the lower pair have respective longitudinal axes 38, FIG. 1 and 96, FIG. 2 which, disposed parallel to one another, define a fixed vertical plane normal to the fixed tilt steering axis 100 defined by the horizontally disposed pivot pins 24. So the column and its supporting frame 16 swing to their various tilted and locked positions in that vertical plane, irrespective and independent of the steering wheel's locked telescoped position changing the plane 104 of the rim 76 into other selected normal telescoped planes 106, 108 and so forth.

In pod 70, a slightly inset switch keyboard panel 116 faces the operator and, while literally downwardly offset therefrom relative to the rim 76 so as to be completely confined within the boundaries of wheel 14, nevertheless affords to the operator a finger touch to the keys which is substantially equidistant to the finger grip portions of the rim and falls essentially coplanar to the plane 104 of the latter. In other words, the hand motion of the operator is essentially lateral in transferring between rim and keyboard panel and back, altogether a minimal distance. While the bifurcate arms (FIG. 2) thereof support the pod's panel 116 somewhat depressed relative to the surrounding wheel rim 76, the panel materially adds to effective face area of the wheel 14 in distributing impact force for safety during a collision. The bifurcate-arm included-angle lends an angle of about 168° to the intersecting halves of the panel 116 to increase keyboard area and number of available switch pad locations.

A bundle or cable 118 of keyboard-connected multiple wires passes nontwistably down the hollow interior 120 of spindle shaft 30, exiting straight out the open lower end thereof behind the outrigger on bracket 88, FIG. 1, so as then to loop into a cable bight 122. Because as a group the switch-keyboard-connected portion of the multiple wire bundle 18, the upper pair of hollow shafts 30 and 50, the pod 70, and the steering wheel 14 are essentially concentric on the slanting slide axis 38, the interposed bight 122 readily accommodates sliding of the gear housing 56, column 12, and wheel 14 without chafing, kinking, or twisting.

The steering wheel torque introduced by pinion 50 into gear 52, thence through the steering shaft splines 60 into the coaxial tube shaft 64, is further transmitted by a torque pin 124 in the slotted end of tube 64 and into a universal joint 126. The center of the universal joint 126 defined by the intersection of its two mutually perpendicular axes is at all times at the same point on the fixed tilt axis 100, about which the column 12 pivots in all tilt positions.

The universal joint 126 (FIG. 2) drives a steering hand pump 128 fixed in the support base 22 and having a longitudinal pump axis 130 intersecting the lower axis 96 at various angles and always at the center of the universal joint 126. Such a hand pump is utilized in hydraulically steered tractors, and serves in lieu of other steering mechanisms such as direct linkage steering, hydraulic power steering, or power boost steering which are all optional offerings to the hand pump and motor contolled thereby.

CONSOLE AND ACTIVATING KEYBOARD—FIG. 3

As viewed by the operator according to this figure of drawing, the pod 70 presents the switch keyboard panel 116 in a handy proximal plane, whereas the instrument console panel 78 occupies a relatively distal plane which is beyond the steering wheel 14, as shown in phantom lines, relative to the operator's eyes. In his sequence looking downwardly from the windshield, not shown, the operator's eyes will fall somewhere on the panel 78, e.g., on the respective left and right dual digital displays 132 and 134, slightly below the top of the wheel 14, and next on the keyboard panel 116 slightly below the dual displays 132 and 134.

A plastic bezel trim 136 frames the panel 78. At the top of the frame, the console instrument cluster 138 takes the form of a horizontal line of gauges and meters. The next lower adjacent line 140 consists of Tellites which show as red when illuminated so as to indicate specific tractor component failures. A columnar upward extension 142 of tellites and another upward extension 144 complete the tellites and, respectively thereabove, are the conventional symbols for the left and right flashing turn signal indicators 145 and 147.

A left horizontal line 146 or translucent annunciator indicia is located immediately below the left digital display 132 and is individually served by annunciator back lighting just beneath the panel 78. The medialmost indicia EGT of the line 146, when individually illuminated by its backlighting just mentioned, annunciates that the left digital display 132 is carrying an exhaust gas temperature reading. Thereadjacent, the translucent operating indicia SET 148 when being simultaneously back lighted indicate that a maximum limiting value for exhaust gas temperature is being programmed in and the instantaneous current value is simultaneously appearing on the left digital display 132.

On the other hand while the annunciator indicia EGT 146 are back lighted and, simultaneously, an adjacent FAIL tellite 150 illuminates, then the significance is that the exhaust gas temperature sensor, not shown, or its circuit has failed.

Again, when the EGT annunciator indicia in line 146 are back lighted and, simultaneously, an ALARM tellite 152 thereabove is illuminated, the significance is that the limiting temperature as programmed has been reached or exceeded for the engine exhaust gas.

A right horizontal line 154 of translucent annunciator indicia, each individually back lighted, is localized below the right digital display 134 so as to indicate which digital reading, is being displayed, for example, the engine RPM function. Thus, when the engine RPM annunciator indicia are back lighted at the same time as the ground speed indicia are back lighted in the left line 146, the side-by-side digital readouts will be in terms of ground speed in the left digital display 132 for comparison simultaneously with the engine RPM digital reading of the right digital display 134. Their current comparative values are of significance.

The particular digital display called for appearing as the reading at 132 is selected by means of the group of four switch pads 154 at the left end of the switch keyboard panel 116 as viewed in FIG. 3. It is similarly by finger touch selection in the right group of four switch pads 156 that the selection for the particular function readout is made for the right digital display 134.

The center of the panel 116 is relegated to a five switch pad group 158 by which various functions or limits are set through a selector switch appropriate thereto and through a switch pad ADV. for changing to a proper setting for readouts from the left digital display 132.

BLOCK DIAGRAM—FIG. 4

For continuity with the vehicle functions mentioned which were discussed above simply for illustration, the functioning vehicle according to this figure is a tractor 160 specifically represented by a portion of its power train carrying a respective speed transmission cover 162 and a range transmission cover 164. For purposes of the eventual ground speed digital readout sought, a ground speed transducer cable lead 166 providing input to conditioning circuits indicated by block 168 is connected to a reluctance transducer 170 which the range transmission cover 164 holds in association with a wheel-connected gear in the range transmission. The generated pulses providing the input to the conditioning circuits 168 are always proportional to tractor ground speed.

Ahead of the speed transmission cover 162, an engine speed transducer cable lead 172 makes connection with a reluctance transducer 174 which is held in proper noncontacting association by the speed transmission housing 176 with an engine-connected gear, not shown. Voltage pulsations through cable lead 172 provide input into the conditioning circuits 168 always proportional to rpm's of engine speed.

The conditioning circuits 168 have other inputs 178 originated at points about the tractor at which remote senders, sensors. and other transducers for monitored vehicle functions are located.

Vehicle functions such as the foregoing are transmitted as conditioned electrical signals through an input cable 180 to a signal microprocessor chip 182 which constantly monitors all such functions. Another electrical cable 184 couples the signal chip 182 to a display microprocessor chip 186 programmed so that, as often as about once per second, the chip 186 senses the same signal or the same several signal functions and ignores for the time the other functions which are being continuously monitored.

So by operator selection through a cable 187 and a cable 188 to the respective dual displays 132, 134 by way of a display driver 190 and a coupling cable 192, the display chip 186 can provide a continuous display at 132 and at 134 of dual tractor functions re-sensed and updated as to currency every second. That selection is made by the keyboard panel 78 coupled to provide its input through a cable 194 into an appropriate section of the display chip 186.

In one physically constructed embodiment of the invention, the signal chip 182 was a commercially procured microchip for computing designated 6805R2 and the counterpart display microchip 186 was designated 6805U2. Preferably, but not necessarily so in other embodiments, the physically constructed embodiment employed a vacuum fluorescent display at 132 on the left and a vacuum fluorescent display 134 as viewed to the right in FIG. 4.

An electrically alterable read only memory EAROM 196 interconnects the two microchip computers 182 and 186 so as to function as a nonvolatile memory therefor. The power supply 198 common to the circuits and to the drivers is included purely for completeness and is shown without the necessary interconnections also being included.

The transducers referred to foregoing can be selected from the group of a variable reluctance magnetic pickup, an optical pickup, or other magnetostrictive or other type pickup which provides a signal proportional to gear tooth frequency. The dual displays construction can be selected from the group of direct current electroluminescence display, liquid crystal display, cathode ray tube, and light emitting diode, in addition to the vacuum fluorescence display previous specified. The switch keyboard panel can have operators selected from the group of push button switches, touch sensitive switches, and forms of micro switches or other types in addition to the already specified switch pads, the latter comprising a common sheet of slightly deflectable plastic having deposited metal contacts on the underside serving to complete a contact switch circuit. The conditioning circuits 168 can be of several acceptable forms including wave shaping circuitry providing analog to digital converter action and flip flopping to divide the pulse frequency by two with greater resolution before passing on the pulse to the microcomputer chips.

The present advance is to be appreciated for lending much improved efficiency, safety, and convenience to the vehicle operator. It is to be further appreciated for rendering the operation foolproof to greater degree in the respect that the large digital displays have been moved to and up the steering column at a much more comfortable and proximal distance than formerly, whereas the switch keyboard requiring the operator's careful scrutiny is even more proximally located at the head of the steering column practically face-to-face with the vehicle operator.

Variations within the spirit and scope of the invention described are equally comprehended by the foregoing description.

What is claimed is:

1. For use in an engine-powered wheel tractor vehicle equipped with a first engine-connected vehicle member and a second wheel-connected vehicle member, the improvement comprising:
   a vehicle operator's steering station having instrument clusters remotely located thereat and disposed essentially in a common instrument panel plane and including digital display means operative to give rate readouts; an instrument keyboard so operatively related to the instrument clusters as to be disposed in a keyboard plane closer to the operator and slightly below the instrument clusters as viewed by the operator; and pivoted steering column structure common to the clusters and keyboard and supporting same so that as located on the steering column structure they occupy spaced-apart parallel instrument panel and keyboard planes in the operative relationship described;
   transducers associated with the first and second vehicle members for generating pulse signals at frequencies proportional to the tachometer rate at which the engine is making revolutions and the rate at which the wheels are turning, and
   operating means including the keyboard and connected to the transducers and the display means to selectively compute and separately operate the latter so as to display accurate engine tachometer digital readouts and ground speed digital readouts.

2. The invention in accordance with claim 1 wherein the pivoted steering column structure includes thereon a steering wheel with a hub, and further wherein:
   there are two digital displays each connected by said operating means to a different one of the transducers so as to be caused by the keyboard to digitally display the tach and ground speed readouts simultaneously to the operator;
   said closer keyboard being nonrotatable, and so located on the pivoted steering column structure that the keyboard plane is closer to the operator than the steering wheel hub.

3. For use in an engine-powered wheel tractor vehicle equipped with a first engine-connected vehicle member and a second wheel-connected vehicle member, the improvement comprising:
   a vehicle operator's station having instrument clusters remotely located thereat and disposed essentially in a common instrument panel plane and including digital display means operative to give rate readouts; an instrument keyboard so operatively related to the instrument clusters as to be disposed in a keyboard plane closer to the operator and slightly below the instrument clusters as viewed by the operator, said keyboard being nonrotatable; and pivoted structure common to the clusters and keyboard and supporting same so they occupy spaced-apart parallel instrument panel and keyboard planes in the operative relationship described;
   transducers associated with the first and second vehicle members for generating pulse signals at frequencies proportional to the tachometer rate at which the engine is making revolutions and the rate at which the wheels are turning;
   operating means including the keyboard and connected to the transducers and the display means to selectively compute and separately operate the latter so as to display accurate engine tachometer digital readouts and ground speed digital readouts; and
   means to tilt the common pivoted structure comprising a tilt steering wheel, and steering shaft means journalled on a slant in the pivoted structure and connected at the upper end to support the steering wheel for freedom of movement in different directions.

4. The invention in accordance with claim 3, characterized by:
   said steering wheel having a hub, the keyboard and wheel fitting respectively one within another and with the keyboard between the operator and the wheel's hub.

5. The invention according to claim 4, further characterized by:
   the finger touch and finger grip portions of the respective keyboard and wheel being equidistant to the operator and essentially coplanar.

6. The invention in accordance with claim 4, constructed, adapted and arranged whereby:
   as viewed looking downwardly in sequence by the operator, the digital display means is slightly below the top of the steering wheel, and the keyboard is slightly below the digital display means.

7. The invention in accordance with claim 3, characterized by:
said steering shaft means comprising slanted telescopically related shafts with different ones of their upper ends connected to the respective steering wheel and keyboard, for sliding movement telescoping the steering wheel and keyboard conjointly up and down on the slant.

8. The invention in accordance with claim 3 characterized by:
said steering shaft means comprising slanting telescopically related shafts with different ones of their upper ends connected to the respective steering wheel and keyboard, for relatively turning on the slanting axis so that the steering wheel rotates whereas the keyboard is nonrotatable.

9. The invention in accordance with claim 3, characterized by:
said steering shaft means comprising slanted telescopically related shafts with different ones of their upper ends connected to the steering wheel and keyboard for conjoint tilting movement therewith of the steering wheel, the keyboard, and the instrument panel.

10. The invention in accordance with claim 3, characterized by:
said steering shaft means comprising slanted telescopically related hollow shafts one within another and with different ones of their upper ends connected to the respective steering wheel and keyboard, and together with the common pivoted structure affording freedom of movement whereby said instrument panel has freedom to tilt, said keyboard has freedom to telescope on a slanting axis and freedom to tilt with the instrument panel in constant angularity therewith, and the steering wheel has freedom to turn in different directions alone, freedom to telescope in different directions with the keyboard, and freedom to tilt in different directions with the keyboard and the instrument panel all at constant angularity.

11. The invention in accordance with claim 9 further comprising:
a frame fixed on the tractor to which the common structure is secured for pivoting on a generally horizontal tilt axis; and
spring means above the tilt axis interconnecting said pivoted structure and the fixed frame to counterbalance the former during tilt adjustments up and down on the frame.

12. The invention of claim 10, further characterized by:
a keyboard connected multiple wire bundle exiting from the hollow at the lower end of said slanted telescopically related shafts in a well defined loop for freedom of movement in different directions;
said shafts slideable in the pivoted structure for telescopic adjustment along the slanted steering axis as accommodated by the looped wire bundle therein.

13. The invention in accordance with claim 3, characterized wherein:
said operating means comprises a bundle of keyboard connected multiple wires, and said steering shaft means comprises slanted, telescopically related hollow shafts arranged one within another and with different ones of their upper ends connected to the respective keyboard and steering wheel, said keyboard connected multiple wire bundle passing nontwistably down the hollow of the slanted keyboard connected shaft.

14. The invention in accordance with claim 13, constructed, adapted and arranged whereby:
the hollow shafts relatively turn on a slanting axis one within another so that the steering wheel rotates whereas the keyboard and keyboard connected multiple wire bundle are nonrotatable.

15. The invention in accordance with claim 13, constructed, adapted and arranged whereby:
the steering wheel connected and keyboard connected hollow shafts relatively turn on a slanting axis so that the steering wheel rotates whereas the keyboard is nonrotatable.

16. The invention in accordance with claim 13, constructed, adapted and arranged wherein:
said slanted hollow shafts and keyboard connected multiple wire bundle in the hollow thereof are essentially concentric to a slanting steering axis.

17. For use in an engine-powered wheel tractor vehicle equipped with a first engine-connected vehicle member and a second wheel-connected vehicle member, the improvement comprising:
a vehicle operator's station having instrument clusters thereat disposed essentially in a common instrument panel plane and including digital display means operative to give rate readouts;
steering column structure supporting the instrument clusters secured against movement;
an instrument keyboard telescopically related to the supporting steering column structure for support nonrotatably but in a plurality of planes of the keyboard parallel to the instrument panel plane;
transducers associated with the first and second vehicle members for generating pulse signals at frequencies proportional to the tachometer rate at which the engine is revolving and the rate at which the wheels are turning; and
means including the keyboard and a keyboard connected multiple wire cable and making electrical interconnection with the transducers and the display means to selectively compute and separately operate the latter so as to display accurate engine tach digital readouts and ground speed digital readouts.

18. For use in an engine-powered wheel tractor vehicle equipped with a first engine-connected vehicle member and a second wheel-connected vehicle member, the improvement comprising:
a vehicle operator's station having instrument clusters thereat disposed essentially in a common instrument panel plane and including digital display means operative to give rate readouts;
steering column structure supporting said clusters with the instrument panel plane remotely confronting the operator for ready viewing;
an instrument keyboard and means mounting same to said supporting steering column structure in parallel to the clusters appreciably nearer the operator;
a fixed frame and means to pivot the supporting steering column structure on the frame into adjusted tilt axis angles;
transducers associated with the first and second vehicle members for generating pulse signals at frequencies proportional to the tachometer rate at which the engine is making revolutions and the rate at which the wheels are turning; and means including the keyboard and connected to the transducers and the display means to selectively compute and separately operate the latter so as to display accurate engine tachometer digital readouts and ground speed digital readouts.

19. The invention in accordance with claim 17, further characterized by:

said supporting steering column structure defining both a slanted steering axis and a hollow interior along said axis; and a keyboard connected multiple wire cable extending from a captive protected position within a hollow interior and along the slanted steering axis to exit outside the bottom end.

20. The invention in accordance with claim 18, additionally characterized by:

said cable defining a bight upon exiting outside the bottom end of said hollow interior to accommodate without kinking the telescopic movement of said keyboard.

21. The invention in accordance with claim 18, characterized by:

said instrument keyboard mounting means telescopically related to the supporting steering column structure for support of the keyboard in a plurality of planes of adjustability with respect to the operator's view and parallel to the instrument panel plane.

* * * * *